United States Patent
Haggard (10) Patent No.: US 9,997,986 B2
(45) Date of Patent: Jun. 12, 2018

(54) MAGNETIC COUPLING

(76) Inventor: James Haggard, Rapid City, MI (US)

( * ) Notice: Subject to any disclaimer, the term of this patent is extended or adjusted under 35 U.S.C. 154(b) by 926 days.

(21) Appl. No.: 14/123,320

(22) PCT Filed: Jun. 1, 2012

(86) PCT No.: PCT/US2012/040384
§ 371 (c)(1),
(2), (4) Date: Mar. 20, 2014

(87) PCT Pub. No.: WO2012/167024
PCT Pub. Date: Dec. 6, 2012

(65) Prior Publication Data
US 2014/0203678 A1  Jul. 24, 2014

Related U.S. Application Data

(60) Provisional application No. 61/492,404, filed on Jun. 2, 2011.

(51) Int. Cl.
*H02K 49/10* (2006.01)
*F16H 49/00* (2006.01)

(52) U.S. Cl.
CPC ......... *H02K 49/102* (2013.01); *H02K 49/106* (2013.01); *F16H 49/005* (2013.01); *H02K 49/104* (2013.01); *H02K 2213/09* (2013.01)

(58) Field of Classification Search
CPC .... H02K 49/10; H02K 49/102; H02K 49/106; H02K 49/104; H02K 51/00;
(Continued)

(56) References Cited

U.S. PATENT DOCUMENTS 4,751,486 A * 6/1988 Minato ................ H02K 53/00
310/103
5,569,967 A   10/1996 Rode
(Continued)

FOREIGN PATENT DOCUMENTS

DE        2847618 A1 *  5/1980  ............. H02K 49/06
DE   102009056227 A1 *  6/2011  ........... H02K 49/102
(Continued)

OTHER PUBLICATIONS

DE 102009056227 A1 (English translation).*
(Continued)

*Primary Examiner* — Joshua Benitez Rosario
*Assistant Examiner* — Alexander Moraza
(74) *Attorney, Agent, or Firm* — Young Basile Hanlon & MacFarlane, P.C.

(57) ABSTRACT

A rotatable magnetic coupler includes disc carrying, circumferentially spaced magnets arranged in rows on a first side of the disc. The magnets are oriented such that one pole of a first magnetic polarity from each magnet faces outwardly from the disc rotation axis while the other pole of a second magnetic polarity for each magnet faces inwardly toward the axis of rotation. The inner row magnets are preferably of lesser height than the outer row magnets to intensify a virtual gear-coupling effect in the magnetic field lines. A magnetic coupling is formed when two such couplers are rotatably mounted sufficiently close to one another that their magnetic fields are coupled together, such that rotation of one coupler rotatably drives the second coupler.

3 Claims, 8 Drawing Sheets

(58) Field of Classification Search
CPC .. H02K 7/1021; H02K 7/1085; H02K 7/1125; H02K 7/125; F16D 27/00; F16D 27/01; F16H 49/00
USPC .... 310/103, 104–110, 83, 101, 92, 90.5, 84, 310/46, 48, 74, 78, 80, 82, 99, 100; 417/420; 464/29
See application file for complete search history.

(56) References Cited

U.S. PATENT DOCUMENTS

| | | | | |
|---|---|---|---|---|
| 5,894,181 | A * | 4/1999 | Imlach | F16C 32/0429 310/90.5 |
| 6,956,311 | B2 * | 10/2005 | Hosaka | H02K 1/2753 310/156.38 |
| 2005/0258692 | A1 * | 11/2005 | Wise | H02K 7/025 310/103 |
| 2006/0255676 | A1 * | 11/2006 | Wise | H02K 7/025 310/103 |
| 2012/0011962 | A1 * | 1/2012 | Richards | F16H 49/005 74/640 |

FOREIGN PATENT DOCUMENTS

| | | | | |
|---|---|---|---|---|
| FR | 2782419 | A1 * | 2/2000 | ........... H02K 49/106 |
| JP | 59093561 | A | 5/1984 | |
| JP | 61132069 | A * | 6/1986 | ........... H02K 49/102 |
| JP | 2002325423 | A * | 11/2002 | |
| WO | 2008123997 | A1 | 10/2008 | |

OTHER PUBLICATIONS

FR 2782419 A1 (English translation).*
JP 61132069 A (English translation).*
DE 2847618 A1 (English translation).*
JP 2002325423 A (English translation).*

* cited by examiner

MAGNETIC COUPLING

RELATED APPLICATION INFORMATION

This application claims the benefit of U.S. Provisional Application No. 61/492,404, filed Jun. 2, 2011, and PCT Application No. PCT/US2012/040384 filed Jun. 1, 2012, the entirety of which provisional application is incorporated herein by reference.

FIELD OF THE INVENTION

The subject matter of the present application is in the field of rotatable magnetic couplings, such as magnetically coupled gears.

BACKGROUND OF THE INVENTION

There are many different situations in which two shafts are mechanically coupled together so that the shafts rotate in unison with each other. Furthermore, there are many different ways of mechanically coupling the shafts together.

For example, in some situations an endless belt or chain is mechanically coupled to a pulley or sprocket, respectively, attached to the two rotatable shafts. Consequently, with the belt or chain disposed around the pulleys or sprockets, the two shafts rotate in unison with each other.

In other situations, the shafts are directly mechanically connected together. For example, a gear wheel may be attached to each of the rotating shafts so that each gear wheel rotates in unison with its associated shaft. The gear wheels are dimensioned and positioned so that they mesh with each other. Consequently, rotation of one shaft rotatably drives the other shaft and vice versa.

The foregoing is by way of example only. There are many different ways to mechanically connect two rotating shafts together so that the shafts rotate in unison with each other, i.e. are rotationally coupled, whether at the same speed or at different speeds.

The primary disadvantage of these previously known means for mechanically coupling two rotating shafts together, however, is that energy is lost in the mechanical connection so that the transmission of energy or power from one shaft to the other shaft is less than 100%, and oftentimes much less than 100%. A major cause of this energy loss is created by the friction inherent in these previously known mechanical connections. These frictional losses, in turn, generate heat which, after a prolonged time or during high-speed operation, can even result in destruction of the coupling from warpage and other material breakdown in the mechanical connection.

SUMMARY OF THE INVENTION

The present invention provides a magnetic coupler which can be used in sets for coupling two rotating shafts together. The resulting coupling overcomes all of the above-mentioned disadvantages of the previously known mechanical couplings.

In brief, the present invention comprises a magnetic coupler comprising a disc which can be rotatably mounted to its own shaft or housing. A plurality of circumferentially-spaced magnets is provided around a face of the disc such that one pole from each magnet faces outwardly from the disc while the other pole for each magnet faces inwardly towards its axis of rotation of the disc. Furthermore, the magnets on the disc are arranged in an outer row and an inner row. It may also be possible to arrange the magnets in more than two rows.

The outer row of magnets includes a plurality of circumferentially spaced magnets each having one pole facing outwardly from the disc while the other pole faces inwardly towards the axis of rotation of the disc. A second or inner row of magnets is also mounted to the disc and likewise includes one pole facing outwardly from the disc and its other pole facing inwardly towards the axis of rotation of the disc. In addition, the same pole which faces outwardly from the first or outer row of magnets is the same pole which faces outwardly from the second or inner row of magnets.

The inner row of magnets preferably includes one magnet that is radially aligned with one magnet in the outer row. In a further form, the inner row of magnets may be of a different height than the outer row, and preferably of a lesser height than the outer row of magnets.

The angular orientation of each of the magnets is arranged so that the outwardly facing magnetic pole of each magnet is oriented plus or minus 60 degrees to a neutral position ($\theta=0°$) of the magnet relative to the magnetic field axis of rotation, i.e. where the neutral axis of the magnetic field that runs between the north and south poles is radially aligned with the disc's axis of rotation. Additionally, the inner row of magnets is positioned closely adjacent to the outer row of magnets such that the magnetic field from the inner row reinforces, modifies and supplements the magnetic field of the outer row of magnets.

The invention further comprises a magnetic coupling formed by two magnetic couplers whose discs are rotatably arranged relative to each other so that the axes of rotation of the two discs are spaced apart. In practice, the two discs are positioned sufficiently close together such that their magnetic fields are coupled together. Consequently, rotation of one disc rotatably drives the second disc due to the coactions (attraction and repulsion) of the magnetic fields. This driving coupling, furthermore, is achieved without incurring frictional losses as in the previously known mechanical couplers.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
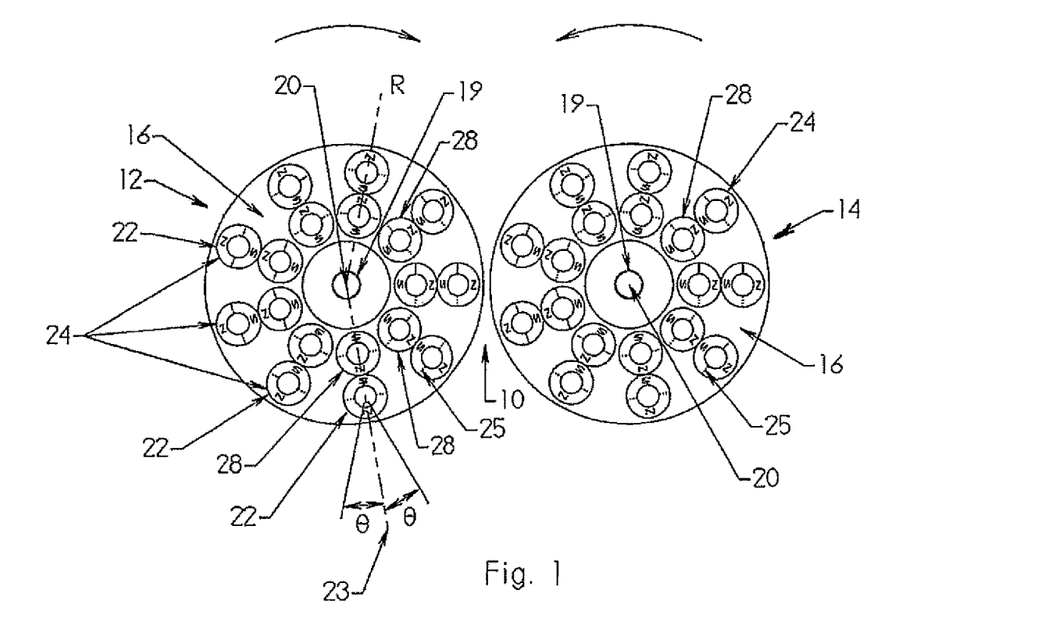
FIG. 1 is a front side (face-on) diagrammatic view illustrating a preferred embodiment of the magnetic coupling of the present invention.
Figure 2:
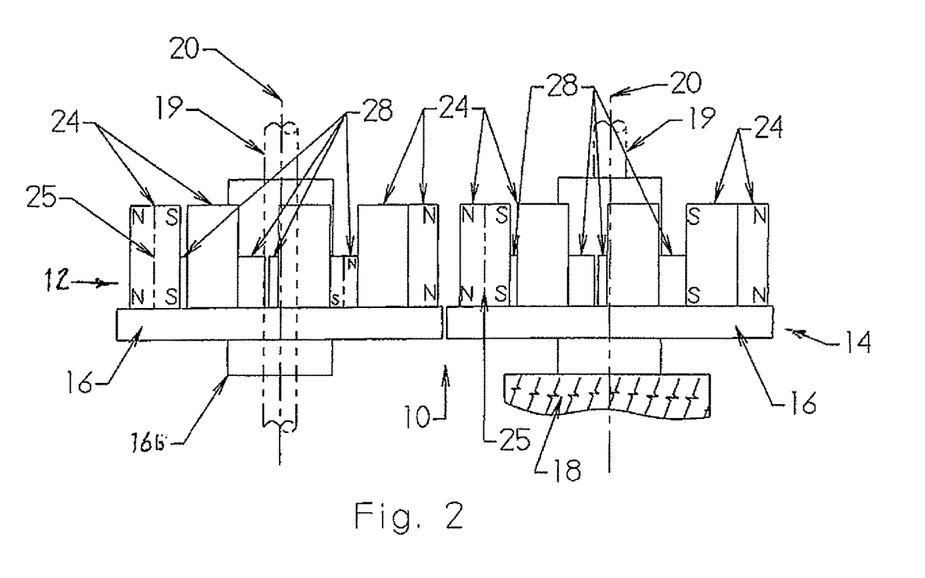
FIG. 2 is a top plan (disc-edge) view of the coupling of FIG. 1.

With reference first to FIGS. 1 and 2, a preferred embodiment of a magnetic coupling 10 according to the present invention is shown. The magnetic coupling 10 includes two magnet assemblies or couplers 12 and 14. Since each magnetic assembly 12 and 14 is substantially identical to the other, only the magnet assembly 12 will be described in detail, it being understood that a like description shall also apply to the other magnet assembly 14.

Figure 3:
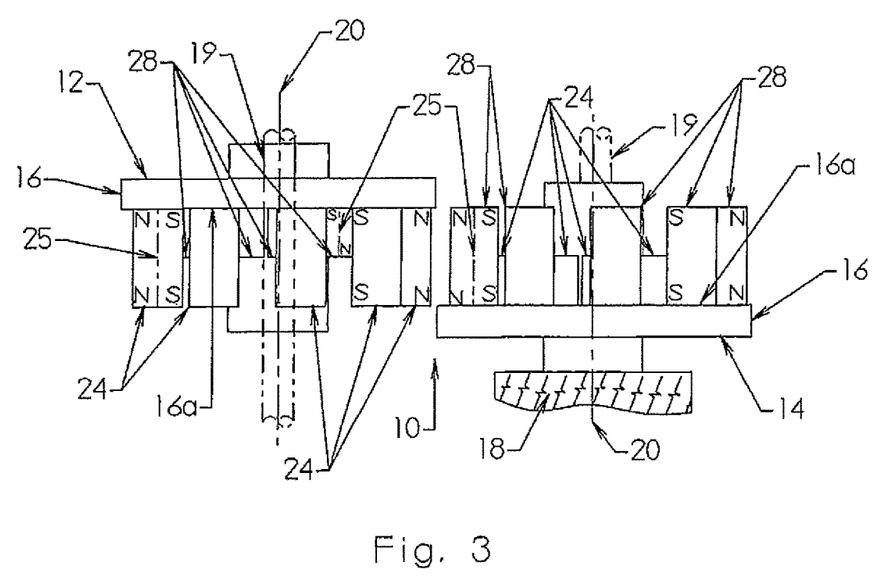
FIG. 3 is a top plan view of the magnetic disc assemblies of the coupling of FIG. 1, modified wherein the magnetic disc assemblies are inverted relative to one another.

The magnet assembly 12 includes a disc 16 which is rotatable about an axis 20 that is mounted to a housing 18 (illustrated only diagrammatically, in FIGS. 2 and 3). For example, disc 16 could be directly connected by hub portion 16b to rotate with housing 18; or, disc 16 could be connected by hub portion 16b to rotate with or around a shaft 19 on housing 18. Furthermore, the disc 16 is illustrated in the drawing as circular in shape, and essentially planar (except for hub 16b) with flat faces 16a, although other non-planar and/or non-circular shapes or magnet-supporting bodies capable of magnetically-coupled rotation relative to one another may be used without deviation from the spirit or scope of the invention and still be considered a "disc" as the term is used herein. In the illustrated example, disc 16 is machined from aluminum, but it is possible to use other materials and manufacturing methods, including but not limited to steel, polymers, and various casting, machining, and molding methods. Currently it is preferred to use a non-ferromagnetic material.

Still referring to FIGS. 1 and 2, an outer row 22 of circumferentially spaced magnets 24 is secured to the disc 16 in any conventional fashion or to inner row 26 magnets 28. As illustrated, nine magnets 24 are contained within the outer row 22 and these nine magnets 24 are circumferentially spaced apart from each other by the same distance. It will be understood, however, that more or fewer magnets 24 may be provided in the outer row 22 without deviation from the spirit or scope of the invention. As illustrated, nine magnets 28 are contained within the inner row 26 and these nine magnets 28 are circumferentially spaced apart from each other by the same distance. It will be understood, however, that more or fewer magnets 28 may be provided in the inner row 26 without deviation from the spirit or scope of the invention. "Row" as used with reference to FIGS. 1 and 2 denotes a regular, circular ring of magnets, although it will be understood that irregular and/or non-circular rows of magnets spaced circumferentially around disc 16 may be possible.

Similarly, an inner row 26 of magnets 28 is also attached to the disc 16 or to outer row 22 magnets 24. One or more magnets 28 is associated with each outer magnet 24. Furthermore, the inner magnets 28 may be radially aligned with their associated outer magnet 24 and are positioned closely adjacent, even in abutment, with the outer associated magnet 24. It is understood that inner magnet 28 retains its vectorial alignment with the axis of rotation of disc 16 without deviation from the spirit or scope of the invention, i.e., if the outer row magnets are rotated the inner row does not have to be. It may also be possible to arrange additional rows or rings of magnets on a disc, for example three or more rows with outer, middle, and inner rows, without limitation.

Figure 8:
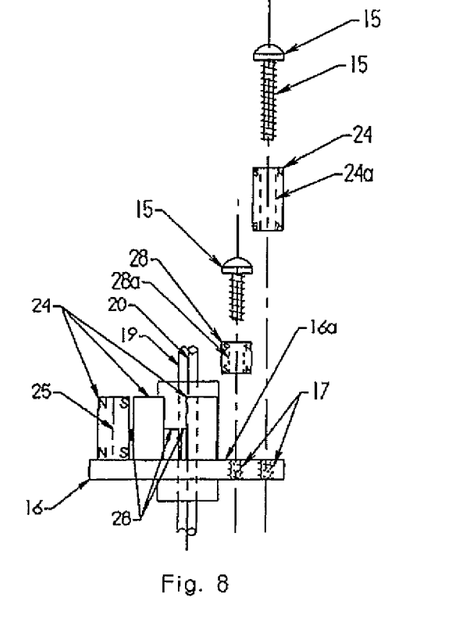
FIG. 8 is a partially exploded side assembly view of an example magnetic assembly according to the diagrammatically-shown assembly of FIG. 1.

In the illustrated example, magnets 24 and 28 are each secured to disc 16 with bolts or machine screws 15 extending through axial bores 24a and 28a in the magnets and into corresponding threaded and tapped holes 17 formed in the magnet-mounting face of the disc. This example construction is best shown in FIG. 8 as a currently preferred method of attachment, but is not intended to be limiting.

As best shown in FIG. 2, the inner magnets 28 are shorter than the outer magnets 24. Preferably, the inner magnets 28 are about one half the length of the outer magnets 24. In general, it is preferred that inner magnets 28 be shorter than the outer magnets 24. It is understood, however, that any length inner magnets 28 are acceptable without deviation from the spirit or scope of the invention.

As shown in FIGS. 1 and 2, the outer row 22 magnets 24 and the inner row 26 magnets 28 are shown as tubular in shape. It is understood, however, that any shape magnet is acceptable without deviation from the spirit or scope of the invention, including but not limited to block shaped and arc segment shaped magnets. In the illustrated example, magnets 24 and 28 are tubular or cylinder neodymium magnets of a commercially available type. "Tubular" is used herein to include tubular or ring magnets with bores or holes through their end-to-end axis, as well as cylinders and discs, with arcuate outer faces. "Magnets" should also be understood to include a single magnetic ring or row structure if it produces magnetic fields equivalent to the multiple spaced magnets in the outer and inner rows shown in the illustrated embodiments.

As best shown in FIG. 1, in the conventional fashion each outer magnet 24 includes a north pole and a south pole. One pole, illustrated as the north pole N, faces outwardly from the disc while, conversely, the other or south pole S faces inwardly towards the axis of rotation of the disc 16; i.e., the magnets are diametrically magnetized with the north and south poles N and S divided by a vertical plane shown bisecting the magnets diagrammatically at 25. The alignment of the poles can, however, be reversed, i.e. with the south pole S facing outwardly and the north pole N facing inwardly in the outer row of magnets 24 is acceptable without deviation from the spirit of scope of the invention. It should be understood that the invention is not limited to diametrically magnetized magnets, and that magnets with axial and other directions of magnetization are acceptable without deviation from the spirit or scope of the invention.

The outer row 22 of magnets 24 is illustrated in FIG. 2 as radially aligned so that the north pole N faces radially outwardly from the disc 16. However, the angle of the pole may vary plus or minus $\theta$ where $\theta$ equals 60 degrees to the neutral axis 23 of the magnetic field that runs between the north and south poles in the neutral position of magnet 24, i.e. where the magnet's magnetic field neutral axis 23 is aligned with a radius line R from the disc's rotational axis 20.

The inner row 26 of magnets 28 may be aligned in the same fashion as the outer row 22, and in the illustrated example are also tubular, diametrically magnetized magnets. Consequently, as illustrated, the north pole N of each inner row magnet 28 faces radially outwardly from the axis of rotation 20 of disc 16 plus or minus 60 degrees to the neutral axis of the magnetic field that runs between the north and south poles of the inner magnet 28, while the south pole S of each inner magnet 28 faces inwardly towards the center of the disc 16 plus or minus 60 degrees to the neutral axis of the magnetic field that runs between the north and south poles.

Figure 7:
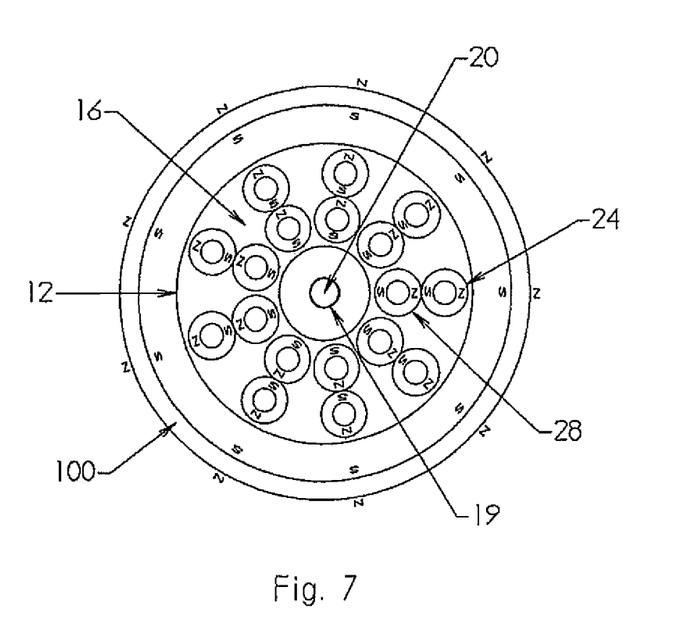
FIG. 7 is a front diagrammatic view of one of the magnetic couplers from the coupling of FIG. 1 surrounded by a magnetic material.

Additionally, as illustrated diagrammatically in FIG. 7, when a magnetic material 100 surrounds disc 16 then the magnetic material will be magnetized with north if outer row 22 has its north pole facing outward or south if outer row 22 has its south pole facing outward.

Referring again to FIGS. 1 and 2, the two magnetic assemblies 12 and 14 are rotatably mounted about parallel axes 20 on shafts or housings 18. Furthermore, the magnet assemblies 12 and 14 are spaced apart from each other by an amount sufficient that the magnet assemblies 12 and 14 do not touch each other, but are magnetically coupled together. As such, rotation of either magnet assembly 12 or 14 will rotatably drive the other magnet assembly 14 or 12 without any frictional loss between the magnet assemblies. It is understood, however, that the axes 20 can be other than parallel and still be acceptable without deviation from the spirit of scope of the invention.

Magnet assemblies' 12 and 14 only contact is magnetically, such that if the magnetic coupling is overwhelmed assemblies 12 and 14 will no longer be a coupling. Hence, the driving force will continue to spin magnet assembly 12 with magnetic assembly 14 being idle or magnet assembly 14 still being driven with magnet assembly 12 being idle resulting in minimum or no damage to the magnet assemblies 12 and 14.

Furthermore, as illustrated in FIG. 3, the magnet assemblies 12 and 14 may be inverted relative to each other, i.e. the disc 16 is on top of one magnetic assembly 12 and the bottom of the other magnetic assembly 14. However, the position of either magnetic assembly 12 or 14 may be inverted from the position shown in FIG. 3 without deviation from the spirit or scope of the invention. The formations of magnetic fields that are invented in the assemblies 12 and 14 that are created through other means are acceptable without deviation from the spirit or scope of the invention.

Figure 4:
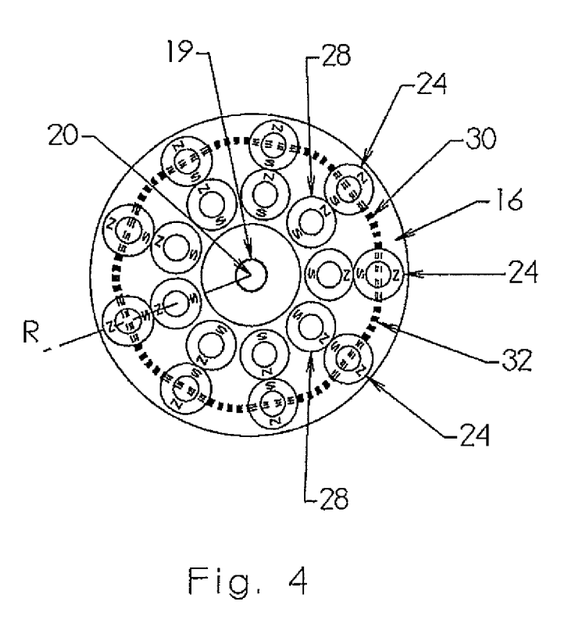
FIG. 4 is a front diagrammatic view of a single magnetic disc assembly or coupler from FIGS. 1-3, and of the magnetic field lines created by the assembly.

The magnetic fields that are created through other means, i.e. coils and electromagnets that duplicate the magnetic fields created by this invention, will still be acceptable without deviation from the spirit or scope of the invention. FIG. 4 diagrammatically illustrates a magnetic field 30 created by a magnetic coupler 12 as in FIGS. 1-3. Magnetic field has apices 32 that are believed to function like virtual magnetic gear "teeth" with respect to similar magnetic fields on adjacent magnetic assemblies such as 12 or 14.

Figure 5:
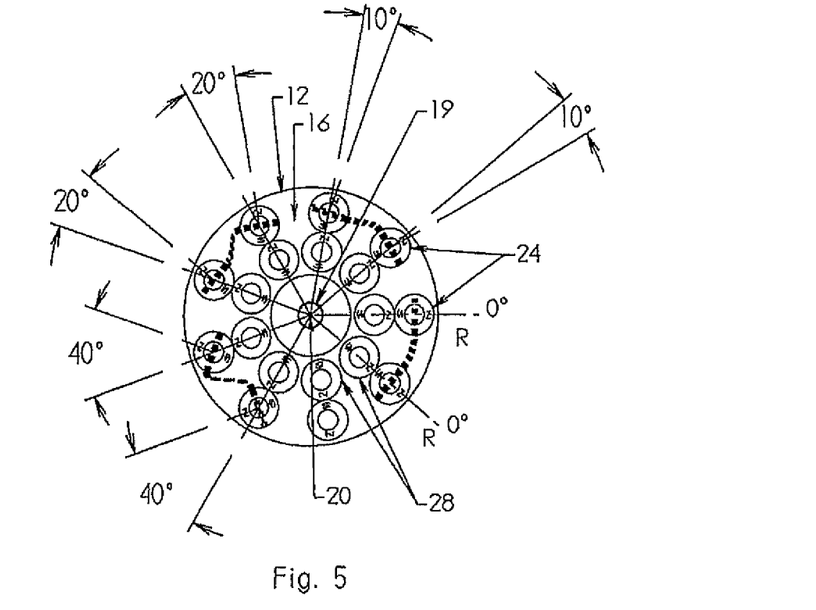
FIG. 5 is a front diagrammatic view of the single magnetic coupler from FIG. 4 with adjacent pairs of the outer row magnets rotated from neutral, and of the altered magnetic field lines created by the assembly.

FIG. 5 diagrammatically illustrates the magnetic field 30 of a magnetic coupler 12 as in FIGS. 1-3, wherein at least some of the outer row 22 magnets 24 have been oriented with the angle of their poles (and thus the angle of the neutral axis of their magnetic field) varied plus or minus θ (where θ equals 60 degrees) out of radial alignment with the disc axis of rotation 20. This alters the magnetic field that produces the coupling effect between adjacent magnetic coupler assemblies such as 12 and 14.

Figure 6:
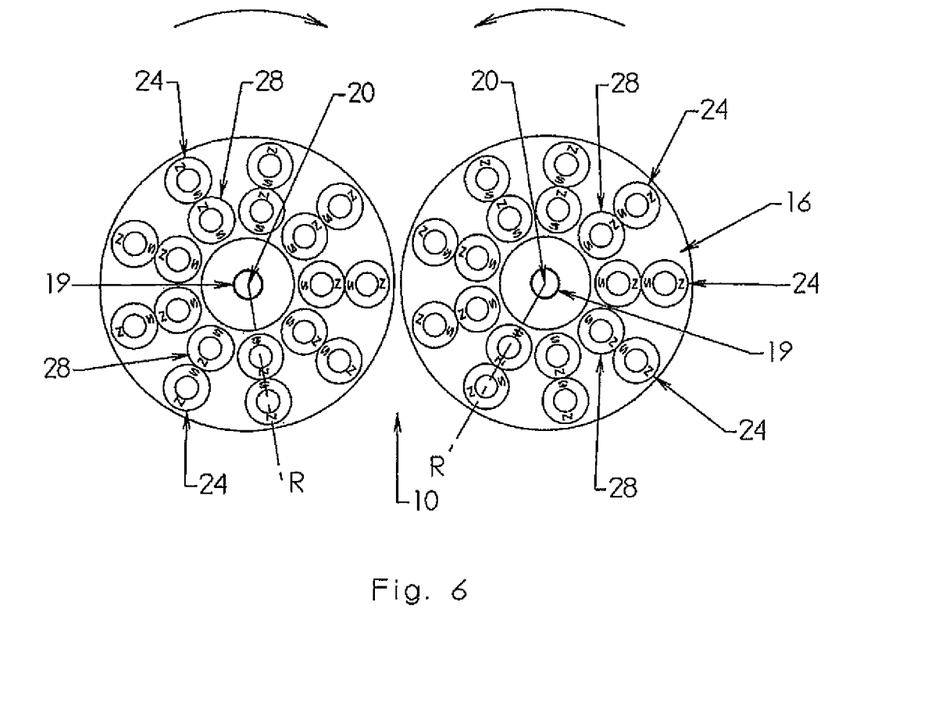
FIG. 6 is a front diagrammatic view of a magnetic coupling comprising the adjusted magnetic coupler of FIG. 4 and a neutral coupler from FIG. 1.

FIG. 6 shows the modified (outer row magnets rotated off-axis) magnetic coupler assembly 12 from FIG. 5 and an unmodified coupler assembly 14 from FIGS. 1-3 located sufficiently close to form a magnetic coupling 10.

The strength of the magnetic coupling effect for any coupler such as 12 or 14 can be adjusted by adjusting the strength and type of magnets 24 and 28, the relative heights of the inner and outer rows of magnets on a disc, and/or the rotational alignment of the magnets' neutral axes relative to the disc axis 20 and/or adjacent magnets on the disc without deviation from the spirit or scope of the invention.

While the magnetic coupler assemblies 12 and 14 in the foregoing examples show all of the magnets mounted on a single side or face of the disc, it may be possible to mount magnets on both sides/faces of a disc, or to mount magnets around the circumferential edge of a disc, to form a magnetic coupler according to the invention.

From the foregoing, it can be seen that the present invention provides a magnetic coupling which completely avoids frictional losses between the couplers, although frictional losses due to the couplers' movement through the air or surrounding fluid and due to any friction in the shafts/housings, will still occur. As such, the driving connection between the magnetic assemblies 12 and 14 is highly efficient.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

DESCRIPTION OF OPERATION

In operation, the a magnetic coupler such as 12 or 14 is used by mounting the coupler on a shaft or housing 18 sufficiently close to another such coupler, with their rotational axes sufficiently parallel that the couplers are magnetically coupled to rotate together. Rotatably driving one coupler 12 or 14 on its rotational axis 20 via shaft 19 or housing 18 will result in the other coupler 14 or 12 being rotated by virtue of the magnetic coupling between them, and thus rotationally driving its own shaft 19 or housing 18. It is also possible that one coupler 12 or 14 is connected to rotate with a shaft, while another coupler 14 or 12 is mounted to rotate about a shaft. While a minimum of two couplers such as 12 and 14 are needed to create a magnetic coupling, it will be understood that more than two couplers may be used in a coupling. And while one coupler 12 driving another coupler 14 is the illustrated and preferred use, a single coupler such as 12 or 14 may have uses on its own.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A rotary motion coupler comprising:

first and second rotary carriers of non-ferrous material, each having a mounting surface with a peripheral edge and an axis of rotation;

each of said carriers having on said mounting surface a first generally circular outer array of tubular bipolar magnets each magnet having a central through hole and arranged at equally spaced angular intervals and of equal radial distances around the axis of rotation, each magnet being oriented with same magnetic pole facing generally radially outwardly;

each carrier further having on said mounting surface a second generally circular inner array of tubular bipolar magnets, each magnet having a central through hole, the magnets in said second array being equal in number to the number of magnets in the first array and arranged in radially aligned and closely adjacent sets including a magnet in the first array and a magnet in the second array, the magnets in the second array being of lesser height then the magnets of the first outer array and located on said surface at a second radial distance from the axis of rotation and oriented with the poles in substantially the same orientation of the poles in the magnets in the first arrays such that the magnetic fields of the first and second magnets are additive;

wherein the first radial distance is greater than the second radial distance;

the angular spacings between magnet sets on the first and second carriers being the same; and the carriers being arranged with said peripheral edges adjacent but spaced from one another and with the axes of rotation in parallel such that rotation of the first carrier causes, through magnetic coupling, synchronous rotation of the second carrier.

2. A rotary motion coupler as defined in claim 1 wherein the magnets in at least the first array are tubular and are fastened to the carrier surface with screws in the through holes thereby to allow angular re-orientation of the poles through an angle of about + or −60°.

3. A rotary motion coupler as defined in claim 1 wherein the arrays of magnets on the first carrier are equal in number to the arrays of magnets on the second carrier.

* * * * *